UNITED STATES PATENT OFFICE.

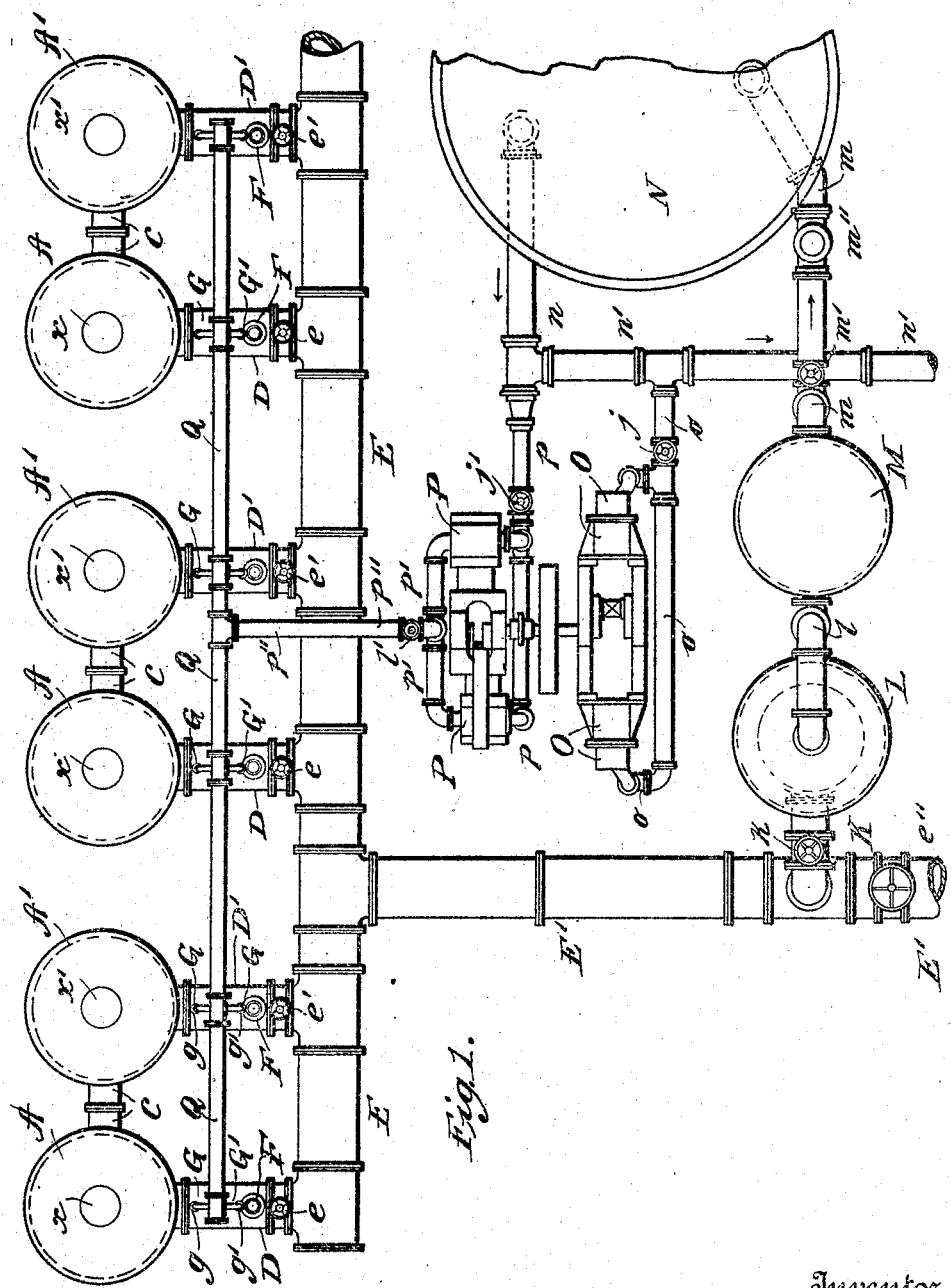

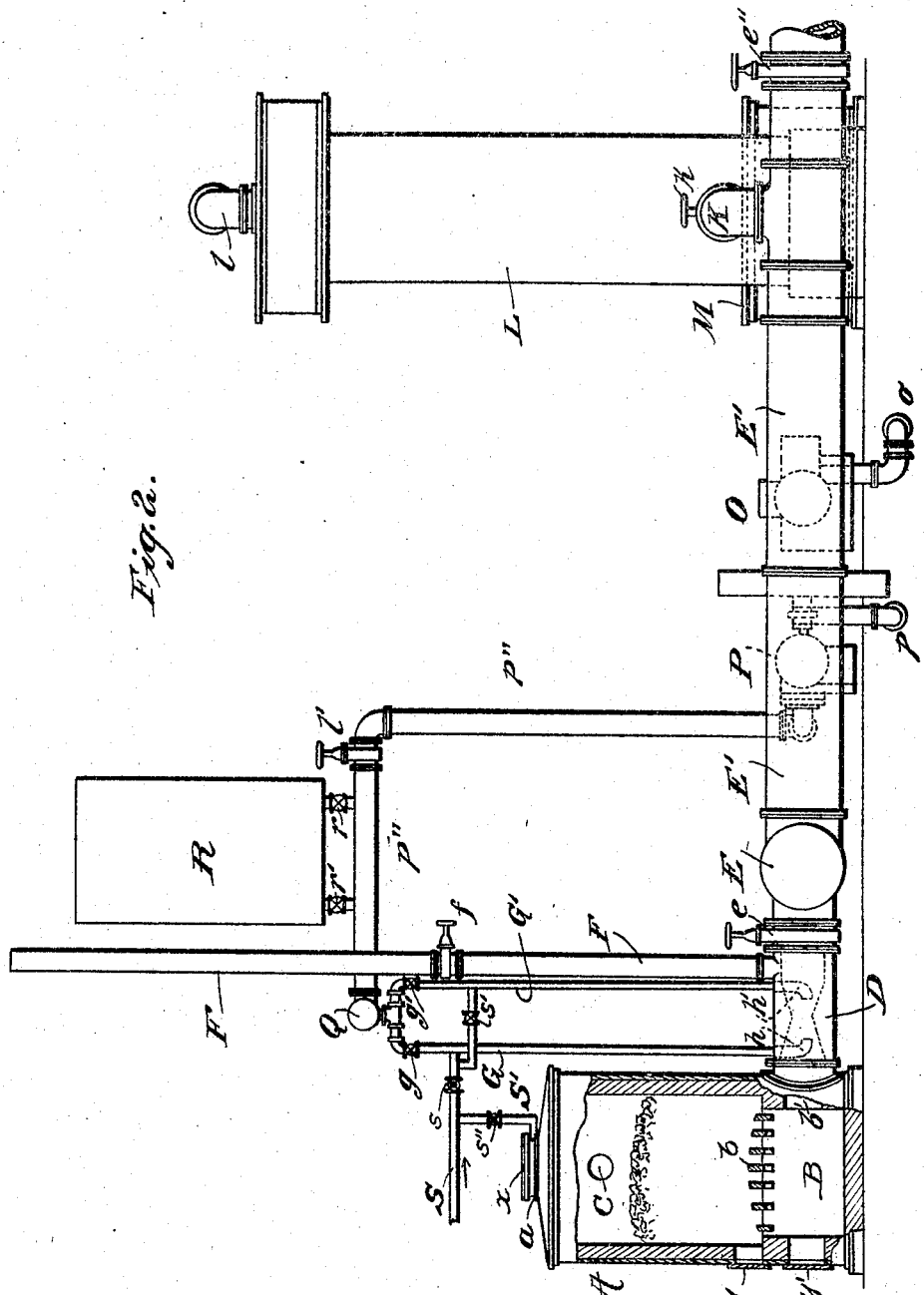

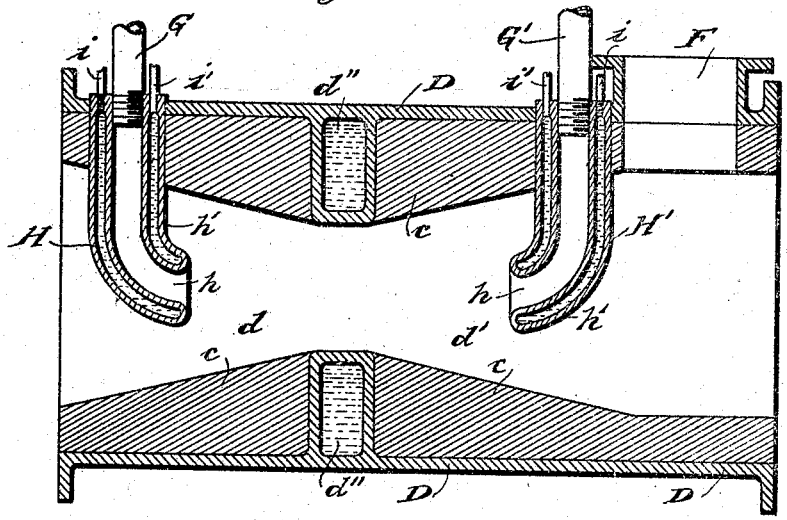
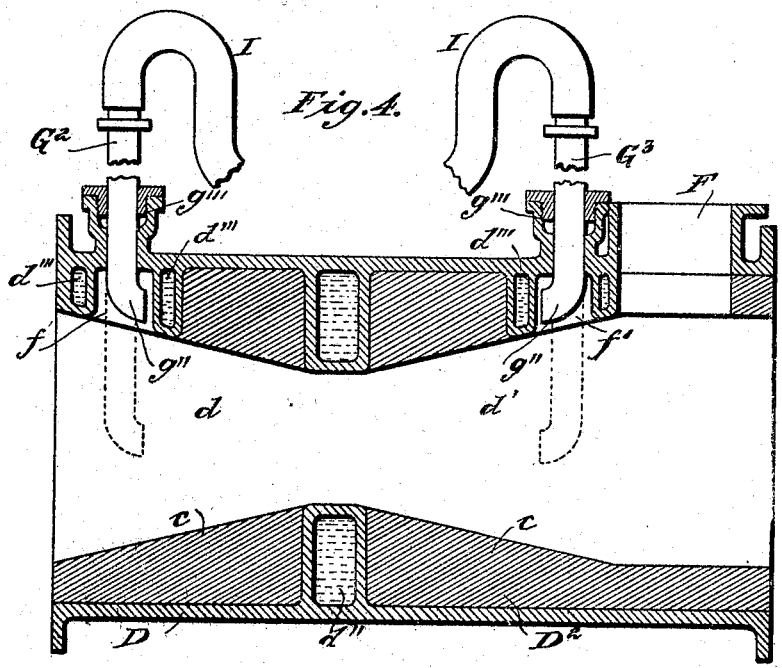

HAWLEY PETTIBONE, OF NEW ROCHELLE, NEW YORK, ASSIGNOR TO THE POWER AND MINING MACHINERY COMPANY, A CORPORATION OF NEW JERSEY.

APPARATUS FOR MANUFACTURING GAS.

No. 900,582.　　　Specification of Letters Patent.　　　Patented Oct. 6, 1908.

Application filed January 11, 1907. Serial No. 351,860.

*To all whom it may concern:*

Be it known that I, HAWLEY PETTIBONE, a citizen of the United States, residing at New Rochelle, in the county of Westchester and State of New York, have invented certain new and useful Improvements in Apparatus for Manufacturing Gas, of which the following is a specification.

This invention relates to apparatus for manufacturing producer-gas, or mixed producer-gas and water-gas, and more particularly, to devices and apparatus for operating connected pairs of generators or producers.

The object of my invention is to provide for drawing off hot gas from a generator and delivering it hot directly to a furnace for metallurgical work, thereby utilizing the sensible heat, without diluting the gas with steam or otherwise affecting its thermal value.

Another object is to provide for utilizing hot gas directly from the generators, thereby saving the sensible heat, and at the same time drawing off a portion of the gas, scrubbing and cleaning it, operating therewith a gas engine and thereby operating a compressor to compress part of the cleaned gas for use in jet exhausters which serve to draw hot gas from the generators and deliver it to metallurgic furnaces.

Another object is to provide for reversing the action of either one of the jet exhausters on a pair of connected generators, or chambers, producing a reverse current through one of the fires or bodies of incandescent fuel, thereby causing pressure in one of the chambers and vacuum or partial vacuum in the other chamber and cleaning the fire of dust and ashes.

Another object is to greatly reduce the cost of a fuel-gas and power plant of a given capacity, by doing away with positive rotary exhausters, steam engines therefor, boilers, connections, etc., and yet preserve the efficiency of the plant.

The matter constituting my invention will be defined in the claims.

My apparatus embraces connecting pairs of generators or chambers; reversible or double jet-exhauster devices, using compressed gas, and connecting the generators with a gas main; scrubbers, a holder, a gas engine, a compressor and details of construction and arrangement of the apparatus which will be fully described in connection with the accompanying drawings, in which:—

Figure 1 represents a top plan view of the apparatus. Fig. 2 represents an end elevation thereof with parts in section and the gas holder omitted. Fig. 3 represents a vertical longitudinal section on enlarged scale, of one of the reversible injector and exhaust devices. Fig. 4 represents a similar view of a modified form of reversible injector and exhaust devices.

The generators are preferably constructed of pairs of connected chambers or furnaces, A, and $A^1$, each having a gas take-off pipe and jet exhaust device at the bottom, as shown in Figs. 1 and 2. A battery of generators may be composed of any desired number of pairs of chambers or furnaces, A and $A^1$ connected to a gas main E. The generators have top fuel openings $a$ closed by lids $x$, $x'$. Each generator has an ash pit B and a grate $b$, preferably composed of brick arches, as shown.

The furnaces A and $A^1$ are connected near the top by a pipe or flue C, which is preferably brick lined. Each furnace is provided with a clinker door $y$ above the grate and an ash pit door $y'$ below the grate. In the ash pit is provided an outlet opening $b'$ and at said opening there is secured to the iron shell a reversible injector and exhaust device D which connects with the gas main E. A jet-exhaust device D connects with furnace A and a second jet-exhaust device $D^1$ connects with furnace $A^1$ and both connect with the main E, for each pair of generators. Each exhaust device D is double and is so provided with connecting pipes as to serve for exhausting gas from the generator and for admitting gas to said generator under pressure or otherwise, as desired.

The reversible injector and exhaust device D is constructed of an outer iron shell and a fire-brick lining $c$, which latter is so shaped as to produce the two cones or frustums of cones $d$ and $d'$, as shown in Fig. 3, that is, a double-frustum cone in each device D. The iron shell or casing is provided centrally with a circular water channel $d''$ for the circulation of cooling water. In the modification, Fig. 4, are provided, near the opposite ends of the iron shell, water cooled channels $d'''$ containing recesses $f'$ for the jet nozzles $g''$. At opposite ends of the device D, Fig. 3, are inserted the water-jacketed jet nozzle pipes H, H¹, each having a water circulating space or channel $h'$ provided with water inlet and outlet pipes $i$, $i'$. The ends of the pipes H, H¹ are turned nearly at right angles forming the discharge nozzles $h$, which, as shown in Fig. 3, are arranged to discharge in opposite directions. The nozzle pipes H, H¹ are stationary and their jet nozzles $h$ are arranged centrally in the conical chambers $d$ and $d'$. At the outer end of each device D is provided a flanged connection for the purge-pipe or stack F, having a valve $f$, Fig. 2. To the outer end of the exhaust devices D, D¹ are connected valve casings containing the water-cooled gate valves $e$, $e'$, said casing connecting in turn with the gas main E which extends along the battery of generators, as shown in Fig. 1. The branch take-off pipe E¹ connects with the main E and leads, in practice, to a metallurgic or other furnace, not here shown. This pipe E¹ is preferably provided with a gate valve $e''$ beyond the branch pipe K. The mains E and E¹ are preferably brick-lined to retain the heat in the gas. With the nozzle pipes H, H¹ connect gas supply pipes G, G¹ having valves $g$, $g'$, for admitting compressed gas to the jet nozzles. These pipes G, G¹ connect at the upper end with a main supply pipe Q. With the gas supply pipes G, G¹ I preferably connect a steam supply pipe S having valves $s$, $s'$ for supplying steam when first starting up the generators, before gas has been stored in the holder. A branch pipe S¹, having a valve $s''$, leads from pipe S and connects with the top of the generator as shown in Fig. 2, for supplying steam when it is desired to make water-gas, or for other purposes.

A branch pipe K, having a valve $k$, leads from gas main E¹ and connects with the base of the wet scrubber L, and a pipe $l$ leads from the top of the scrubber and connects with the dry scrubber M. A pipe $m$, having a valve $m'$ and a drip-pot $m''$, leads from scrubber M into the holder N. The holder is made comparatively small as it is only intended to store a small volume of gas at a time for supplying the gas engine and compressor. A pipe $n$ and branch pipe $n'$ lead from the holder and connect by branch pipes $o$ and $p$, respectively, with a double gas engine O and double compressor P. The gas outlet pipe $n'$ may be extended to conduct cool, clean gas to other gas-engines or any desired place of use. The shaft of the engine O is provided with a fly-wheel and is extended to form the shaft of the compressor P, or is coupled to such shaft. Outlet pipes $p'$ lead from opposite ends of the compressor and connect with the pipe $p''$, having a valve $l'$, and leading to the main supply pipe Q for supplying compressed gas to the downwardly extending pipes G and G¹, which supply the exhaust devices D, D¹ along the battery of generators, as shown in Figs. 1 and 2. The supply of gas to the jet nozzles $h$ and $h'$ is controlled by the valves $g$, $g'$.

If desired, A tank or chamber R for holding compressed gas may be connected in or to the pipe $p''$ so that a volume of compressed gas may be constantly stored for use in starting the jet-exhausters and the generation of gas.

In the modified form of double jet-exhauster D² shown in Fig. 4, gas supply pipes G² and G³ are made to slide up and down in the stuffing boxes $g'''$ so that their nozzles $g''$ may be drawn up into the boxes or recesses $f'$ so that one of them may be out of the way while the other is in use, or so that both may be drawn up at the same time when desired. The recesses $f'$ are preferably provided with water jackets or water-cooled spaces $d'''$ in which water will be circulated for keeping the recesses cool and thus protecting the nozzles $g''$. The dotted lines indicate the positions of the jet-nozzles when they are slid down into operative position. Flexible supply pipes I are preferably connected with the sliding pipes G², G³ for permitting them to be more readily adjusted. Since the heat is apt to be quite high at the contracted part of the double cone, I preferably provide the hollow water circulating ring $d''$ at that point and in practice such ring will be provided with water inlet and outlet pipes, not here shown.

The generators are operated in pairs, as A, A¹, and any desired number will be put into operation at a time to meet the demand for gas required in metallurgic or other furnaces. Fires will be kindled in the generators A, A¹ and may at first be allowed to burn by natural draft by opening the top lids $x$, $x'$. In starting operation of the plant, before any gas has been made, and with the gas holder empty, steam may be admitted to the jet pipes by opening the valves $s$ and $s'$. Steam at first will be passed only into the jet pipes $h$ so as to draw air through the top opening $a$ and down into the bed of fuel and exhaust gas through the devices D, D¹, and pass it up through the purge pipes F, the valves $f$ thereof being open. At this time gate valves $e$ and $e'$ may be closed. After the generators A, A¹ have been suitably charged with fuel and deep bodies of incandescent fuel formed therein, the valves $e$, $e'$ will be opened and the purge valves $f$ will be closed. The exhaust jets of steam through nozzles $h$ being continued, the gas, as generated in furnaces A, A¹, will be forced through the mains E and E¹ and delivered to the scrubber L. As soon as good gas is being delivered through pipes E¹, the valve $h$ will be opened and valve $e'''$ closed so as to pass the gas through the scrubbers L and M and thence into the holder N. This clean, cool gas may now be delivered by pipes $n$ and $o$ to the gas engine O, putting the same into operation. At the same time the compressor P will be started and gas will be delivered thereto through pipe $p$ and will be discharged therefrom through pipes $p'$ and $p''$ to the main supply pipe Q. Steam is now shut off by closing valves $s$ and gas is admitted by opening valves $g$ and passing it through exhaust nozzles $h$. The jets of escaping gas from the nozzles $h$ will now serve to exhaust gas from the generators A, $A^1$ and it will only be necessary to supply fuel to the generators and leave the lids $x$, $x'$ open. Of course air will be continuously drawn down into the beds of incandescent fuel and serve for generating producer gas. With this down-draft generating plant, soft or bituminous coal can be effectively used for making high-grade producer-gas. The gas delivered to the compressor P will be compressed to any desired pressure for most effectively operating the jet exhausters. An important advantage is gained by using compressed gas in the jet exhauster instead of steam, as thereby the gas drawn from the generator is not diluted with a moist non-combustible fluid, but, on the contrary, is delivered hot and without any change in its thermal value. In practice this is quite important where high and uniform heats are to be maintained in furnaces.

So soon as good producer-gas is being generated in generators A, $A^1$, by operation of the exhaust devices D, $D^1$ with jets of compressed gas through nozzles $h$, the valve $e''$ in gas main $E^1$ will be opened, and the gas as produced will be discharged hot through main $E^1$ to a place of use. The gas used for operating the exhaust devices being of the same quality as the gas generated will not affect its thermal value.

During operation of the apparatus a sufficient volume of gas will be passed from main $E^1$ through the scrubbers to the holder to maintain a continuous supply thereof to gas-engine O and compressor P for operating the gas-jet exhaust devices D, $D^1$.

At any desired time part of the compressed gas may be drawn from pipe $p''$ and stored in a tank R by opening valve $r$. When it is desired to use the compressed gas in tank R, valve $r'$ will be opened. This compressed gas may be used when starting up the generators after a period of rest.

After operating the generators for a period of twelve or twenty-four hours, the fires or beds of fuel are apt to become plugged with dust and ashes so as to greatly impede the generation of gas. In order to reduce the vacuum on the fires and free them from dust and ashes, I reverse the action of one of the exhauster devices, that is, I shut off the gas from the exhaust nozzle $h$ in the device D and then admit compressed gas by opening valve $g'$ through the jet nozzle $h'$, thereby blowing compressed gas up through the body of fuel in generator A. The gas may be admitted to the nozzle $h'$ in sudden puffs or impulses so as to better blow out the dust and ashes from the interstices of the fuel. A reverse current is established through the fires and at the same time all of the gas will be drawn down through the body of fuel in generator $A^1$ and off through the exhaust device $D^1$. While cleaning the fire in generator A the gate valve $e$ may be closed. Since a jet of gas will be admitted through nozzle $h$ in the device $D^1$, acting as an exhauster, and gas is shut off from the nozzle $h$ in the device D, there will be pressure in the bottom of generator A and vacuum in the bottom of generator $A^1$, which will serve to rapidly clean the fire in generator A. This cleaning operation can be performed in a very short time—one or two minutes. When it is desired to clean the fire in generator $A^1$, gas will be shut off from the exhaust nozzle $h$ and admitted through the nozzle $h'$ in the device $D^1$, while, at the same time, the exhauster $h$ in the device D will be in operation. This cleaning operation can be quickly done at any time without stopping the generation of gas or in any way affecting the quality of the gas generated. During the cleaning operation above described, the top doors of both generators will be closed.

In the above described operation, dust and ashes, which tend to plug the fire, are blown principally from the body of incandescent fuel and lodge mostly on the side walls of the generator, the main object being to open the fire or body of fuel to the passage of air and gas. At certain intervals of twelve to twenty-four hours the generation of gas in a generator is suspended and the ash and cinder removed through the doors $y$ and $y'$. During this cleaning operation, gas is shut off from the jet nozzles $h$—$h'$ and valve $e$ is closed.

Having described my invention, what I claim, and desire to secure by Letters Patent, is—

1. The combination with a gas generator and outlet pipe, of a jet exhauster, means for compressing part of the outflowing gas, and a pipe connection therefrom to said exhauster, substantially as described.

2. The combination with a gas-generator having means for admitting air and the main gas outlet pipe, of a double jet injector device in said outlet pipe, and adapted for discharging jets in opposite directions, and means for supplying compressed gas to the nozzles of said device, whereby hot gas may be drawn off from the generator and the current reversed through the generator, substantially as described.

3. The combination with a gas-generator having means for admitting air and the main gas outlet pipe, of a double jet injector device in said outlet pipe, and adapted for discharging jets in opposite directions, and means for compressing gas and storing it under pressure and supplying such compressed gas to the jet nozzles, whereby hot gas may be drawn off and the current through the generator reversed, substantially as described.

4. The combination with a pair of generators or chambers connected near the top, of a main gas outlet pipe connecting with the base of each and a jet injector exhauster in each outlet pipe, whereby the current may be reversed through both chambers, substantially as described.

5. The combination with a gas generator, of a main gas outlet pipe having a jet injector exhauster, means for compressing and supplying gas thereto under pressure, a second pipe arranged for supplying gas in the opposite direction, and a valve in said outlet pipe, whereby gas can be passed from the second pipe into the generator, substantially as described.

6. The combination with a gas generator and main outlet-pipe, of a reversible jet injector exhaust device, adapted to discharge a jet, at will, in opposite directions, whereby a jet of fluid may be discharged outward for drawing gas from the generator or discharged into the generator, substantially as described.

7. The combination with a gas generator and main outlet-pipe, of a double-jet injector device having tapering or conical chambers connecting at their contracted ends and a jet nozzle in each of said chambers pointing into the contracted end, substantially as described.

8. The combination with a gas generator and main outlet-pipe, of a double-jet injector device composed of a casing having a central water jacket, or channel, connecting and oppositely flaring conical gas passages and water-jacketed jet nozzle-pipes in said passages, substantially as described.

9. The combination with a gas generator and main outlet-pipe, of a double-jet injector device composed of a casing having a central water jacket, or channel, connecting and oppositely flaring conical gas passages and jet nozzles in said passages pointing inward to the contracted portion, substantially as described.

10. The combination with a gas generator and outlet-pipe, of an interposed injector device having a tapering chamber or passage, a recess in the wall adjacent to its enlarged inlet end, and a movable supply, or nozzle-pipe arranged to slide through the recess, whereby the jet nozzle may be projected into the tapering passage or withdrawn into the recess, substantially as described.

11. The combination with a gas generator and outlet pipe, of an interposed injector device having a tapering or conical passage provided with a pocket or recess in the wall near its enlarged end and a sliding nozzle-pipe passing through the recess, whereby its nozzle may be drawn into the recess for protection, substantially as described.

12. The combination with a gas generator and outlet-pipe, of an interposed injector exhaust device having a recess and passageway in the wall, a sliding nozzle pipe in said passageway and a flexible supply pipe connecting with the nozzle pipe, substantially as described.

13. The combination with a gas generator and outlet-pipe, of an interposed injector exhaust device having a water-jacketed recess and a passageway leading thereto in the wall, and a sliding nozzle-pipe in said passageway, substantially as described.

14. The combination with a gas generator and outlet-pipe, of an interposed jet injector exhaust device, a gas compressor and a valved pipe connection therefrom to the injector device, substantially as described.

15. The combination with a gas generator, of means for cooling and cleaning the gas generated, means for compressing it, and pipe and valve-connections from the generator to said cleaning and compressing devices and from the latter to the generator, substantially as described.

16. The combination, with a gas generator and outlet-pipe, of an injector exhaust device, a scrubber, a gas-engine, a compressor, and pipe-connections from the generator to said parts and back to the injector device at the generator, substantially as described.

17. The combination with a gas generator, a scrubber, a holder, a gas engine, a compressor and pipe connections from the generator to and between said parts and back to the generator, substantially as described.

18. The combination with a gas generator, a scrubber, a gas-engine, a compressor, a reservoir adapted to hold compressed gas, and pipe connections from the generator to and between said parts and back to the generator, substantially as described.

In testimony whereof I affix my signature in presence of two witnesses.

HAWLEY PETTIBONE.

Witnesses:
 ROBT. H. CLARK,
 FRANCIS S. MAGUIRE.